(12) United States Patent
Warmenhoven

(10) Patent No.: US 11,916,894 B2
(45) Date of Patent: *Feb. 27, 2024

(54) PROTECTING AGAINST NETWORK VULNERABILITIES

(71) Applicant: UAB 360 IT, Vilnius (LT)

(72) Inventor: Adrianus Warmenhoven, Overijssel (NL)

(73) Assignee: UAB 360 IT, Vilnius (LT)

( * ) Notice: Subject to any disclaimer, the term of this patent is extended or adjusted under 35 U.S.C. 154(b) by 70 days.

This patent is subject to a terminal disclaimer.

(21) Appl. No.: 17/703,987

(22) Filed: Mar. 25, 2022

(65) Prior Publication Data
US 2023/0308469 A1    Sep. 28, 2023

Related U.S. Application Data

(63) Continuation of application No. 17/703,945, filed on Mar. 24, 2022, now Pat. No. 11,503,008.

(51) Int. Cl.
*H04L 9/40*    (2022.01)

(52) U.S. Cl.
CPC .......... *H04L 63/08* (2013.01); *H04L 63/1433* (2013.01); *H04L 63/20* (2013.01)

(58) Field of Classification Search
CPC ...... H04L 63/08; H04L 63/20; H04L 63/1433
USPC ....................................................... 726/3, 25
See application file for complete search history.

(56) References Cited

U.S. PATENT DOCUMENTS

| | | |
|---|---|---|
| 8,805,980 B1 | 8/2014 | Synnestvedt |
| 9,959,398 B1 * | 5/2018 | Blair ...................... H04L 63/08 |
| 2010/0177892 A1 | 7/2010 | Choi et al. |
| 2023/0065687 A1 * | 3/2023 | Kendall ................ H04L 63/083 |

* cited by examiner

*Primary Examiner* — Benjamin A Kaplan
(74) *Attorney, Agent, or Firm* — The Pattani Law Group

(57) ABSTRACT

A method including pre-authenticating, by an infrastructure device, a user device for obtaining communication services from a server, the pre-authenticating including determining a given duration of time and a communication parameter associated with a pre-authentication request received from the user device; and operating, by the infrastructure device, a port associated with the server in an activated mode for the given duration of time to enable the user device to transmit an authentication request indicating the communication parameter prior to an expiration of the given duration of time. Various other aspects are contemplated.

20 Claims, 6 Drawing Sheets

400

410 — Pre-authenticating, by an infrastructure device, a user device for obtaining communication services from a server, the pre-authenticating including determining a given duration of time and a communication parameter associated with a pre-authentication request received from the user device 420 — Operating, by the infrastructure device, a port associated with the server in an activated mode for the given duration of time to enable the user device to transmit an authentication request indicating the communication parameter prior to an expiration of the given duration of time

PROTECTING AGAINST NETWORK VULNERABILITIES

CROSS REFERENCE

This application is a continuation of U.S. Non-Provisional patent application Ser. No. 17/703,945, filed on Mar. 24, 2022, and titled "Protecting Against Network Vulnerabilities," the entire contents of which are incorporated herein by reference.

FIELD OF DISCLOSURE

Aspects of the present disclosure generally relate to cyber security, and more particularly to protecting against network vulnerabilities such as cybercrimes.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent an occurrence of the cybercrime and/or to mitigate risks associated with the cybercrime.

SUMMARY

In one aspect, the present disclosure contemplates a method including operating, by an infrastructure device, a port associated with a server in a deactivated mode; receiving, by the infrastructure device, a communication from a user device in association with obtaining communication services from the server; pre-authenticating, by the infrastructure device, the user device for obtaining the communication services based at least in part on information indicated in the communication; and operating, by the infrastructure device, the port associated with the server in an activated mode to enable the user device to establish a connection with the server based at least in part on pre-authenticating the user device.

In another aspect, the present disclosure contemplates a device including a memory and a processor communicatively coupled to the memory, the memory and the processor being configured to: operate a port associated with a server in a deactivated mode; receive a communication from a user device in association with obtaining communication services from the server; pre-authenticate the user device for obtaining the communication services based at least in part on information indicated in the communication; and operate the port associated with the server in an activated mode to enable the user device to establish a connection with the server based at least in part on pre-authenticating the user device.

In another aspect, the present disclosure contemplates a non-transitory computer readable medium storing instructions, which when executed by an infrastructure device, cause the infrastructure device to: operate a port associated with a server in a deactivated mode; receive a communication from a user device in association with obtaining communication services from the server; pre-authenticate the user device for obtaining the communication services based at least in part on information indicated in the communication; and operate the port associated with the server in an activated mode to enable the user device to establish a connection with the server based at least in part on pre-authenticating the user device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
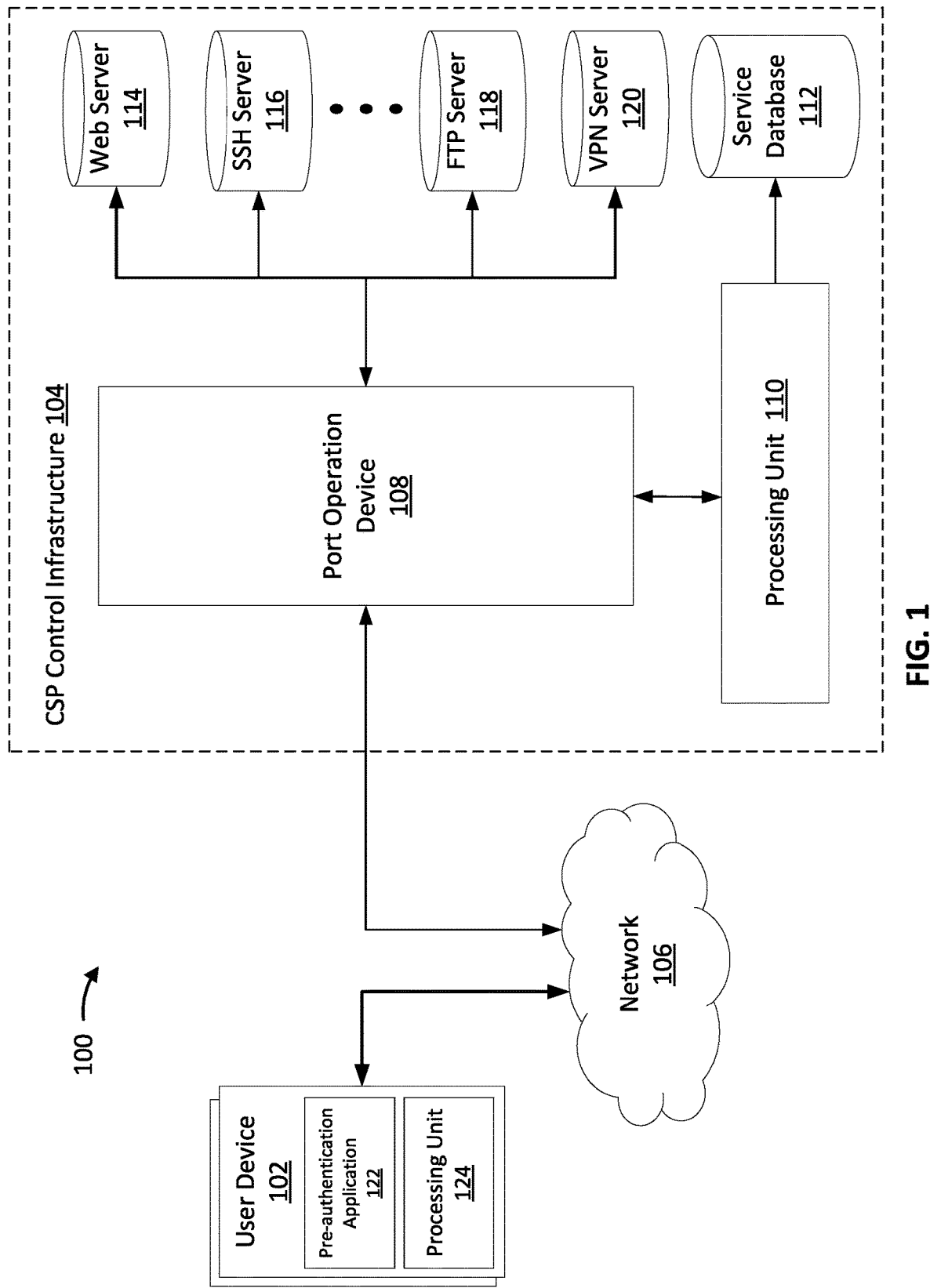

FIG. 1 is an illustration of an example system associated with protecting against network vulnerabilities, according to various aspects of the present disclosure.

Figure 2:
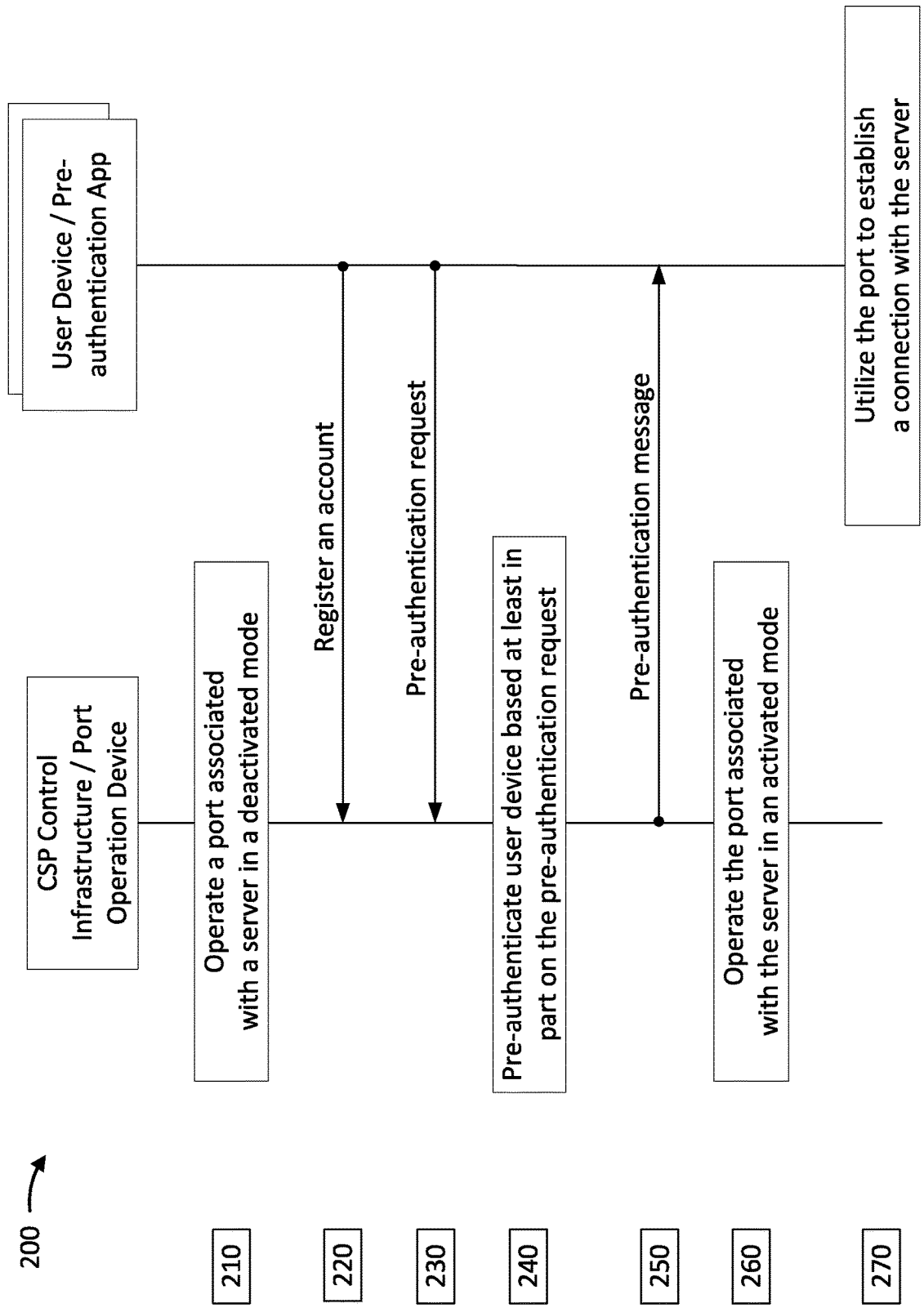

FIG. 2 is an illustration of an example flow associated with protecting against network vulnerabilities, according to various aspects of the present disclosure.

Figure 3:
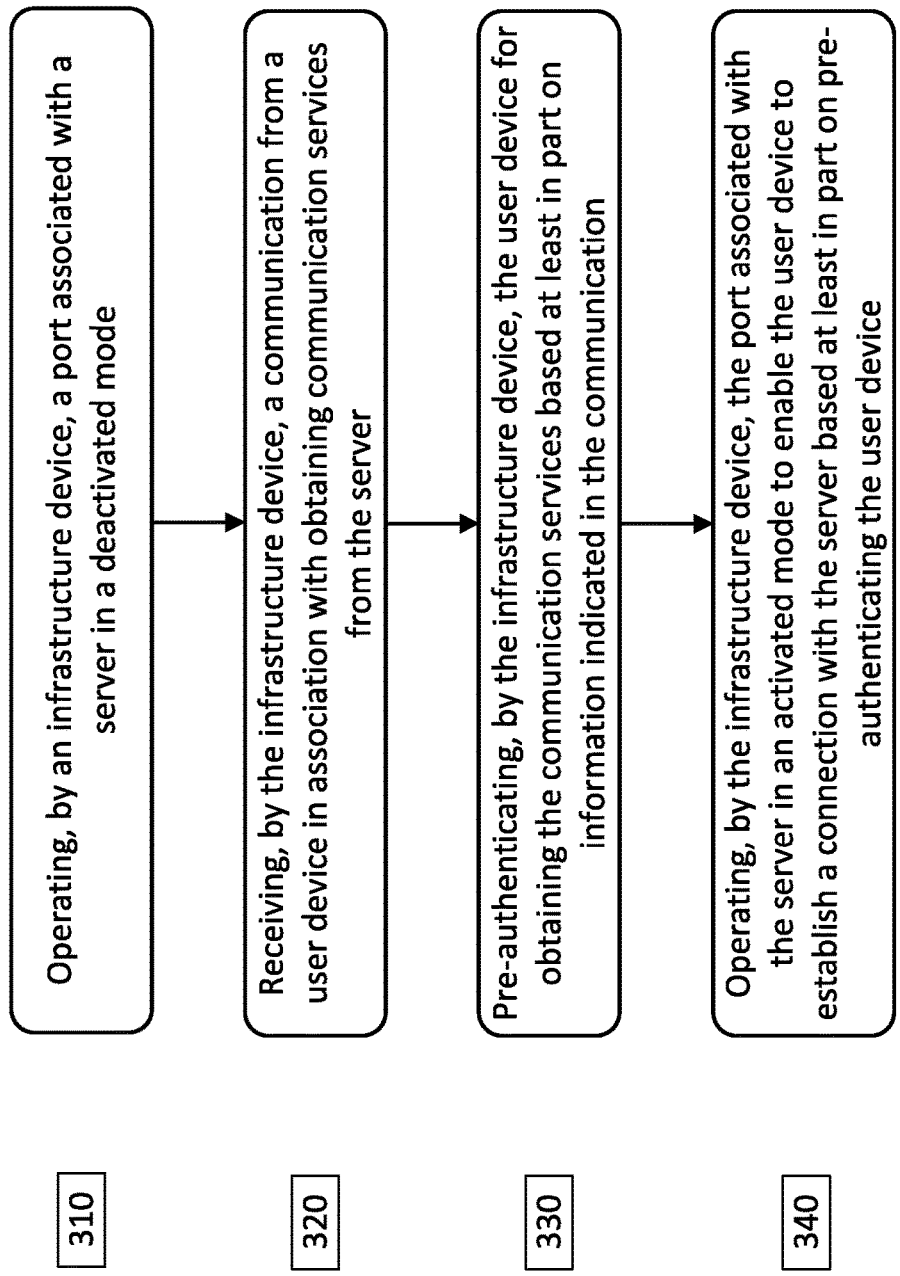

FIG. 3 is an illustration of an example process associated with protecting against network vulnerabilities, according to various aspects of the present disclosure.

Figure 4:
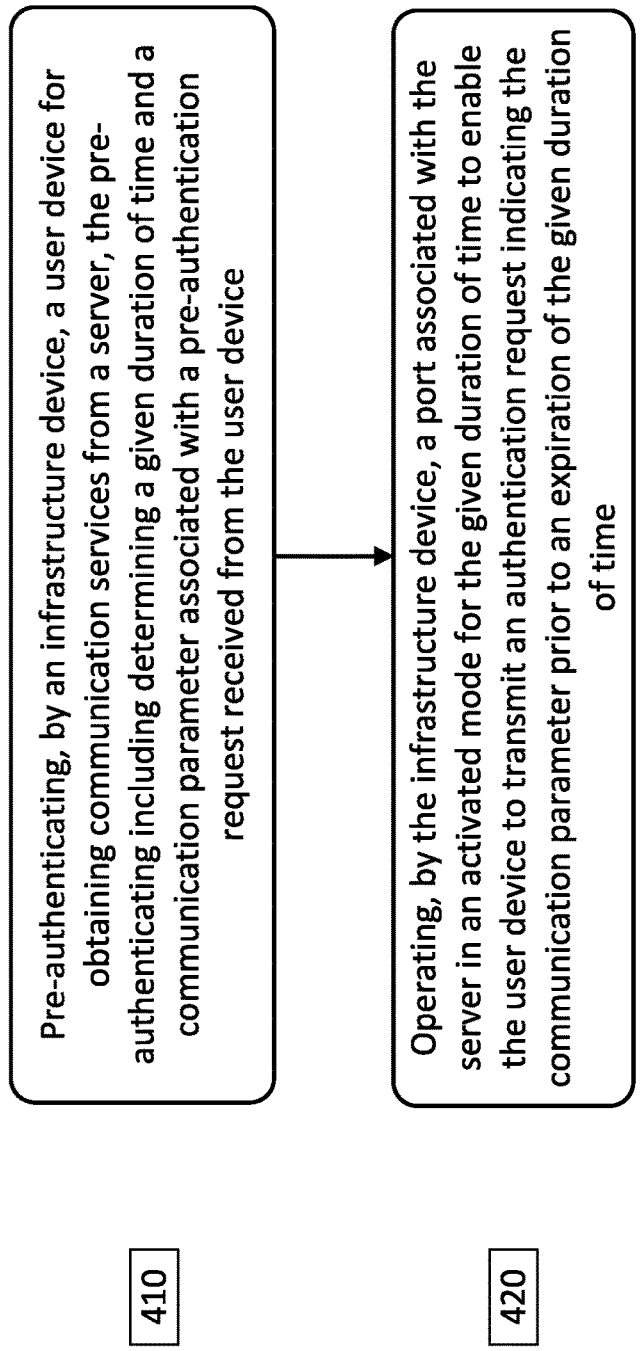

FIG. 4 is an illustration of an example process associated with protecting against network vulnerabilities, according to various aspects of the present disclosure.

Figure 5:
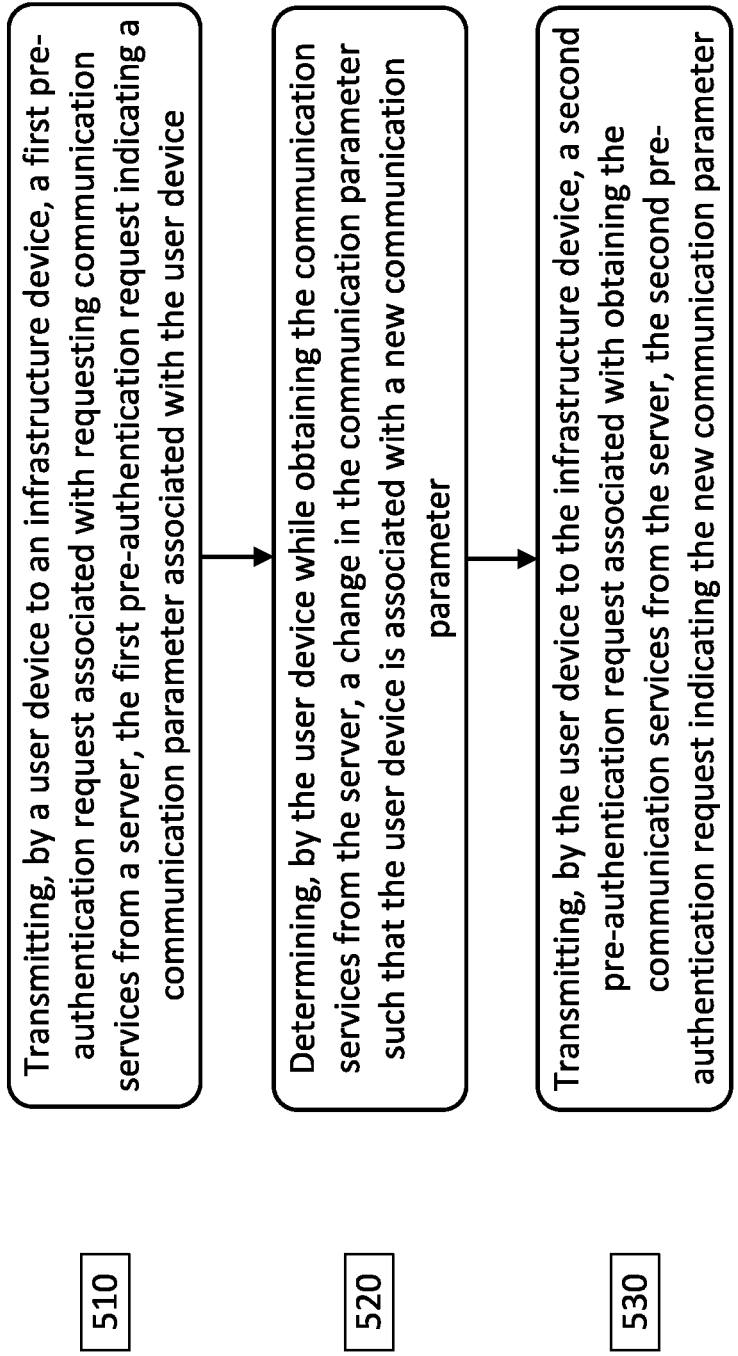

FIG. 5 is an illustration of an example process associated with protecting against network vulnerabilities, according to various aspects of the present disclosure.

Figure 6:
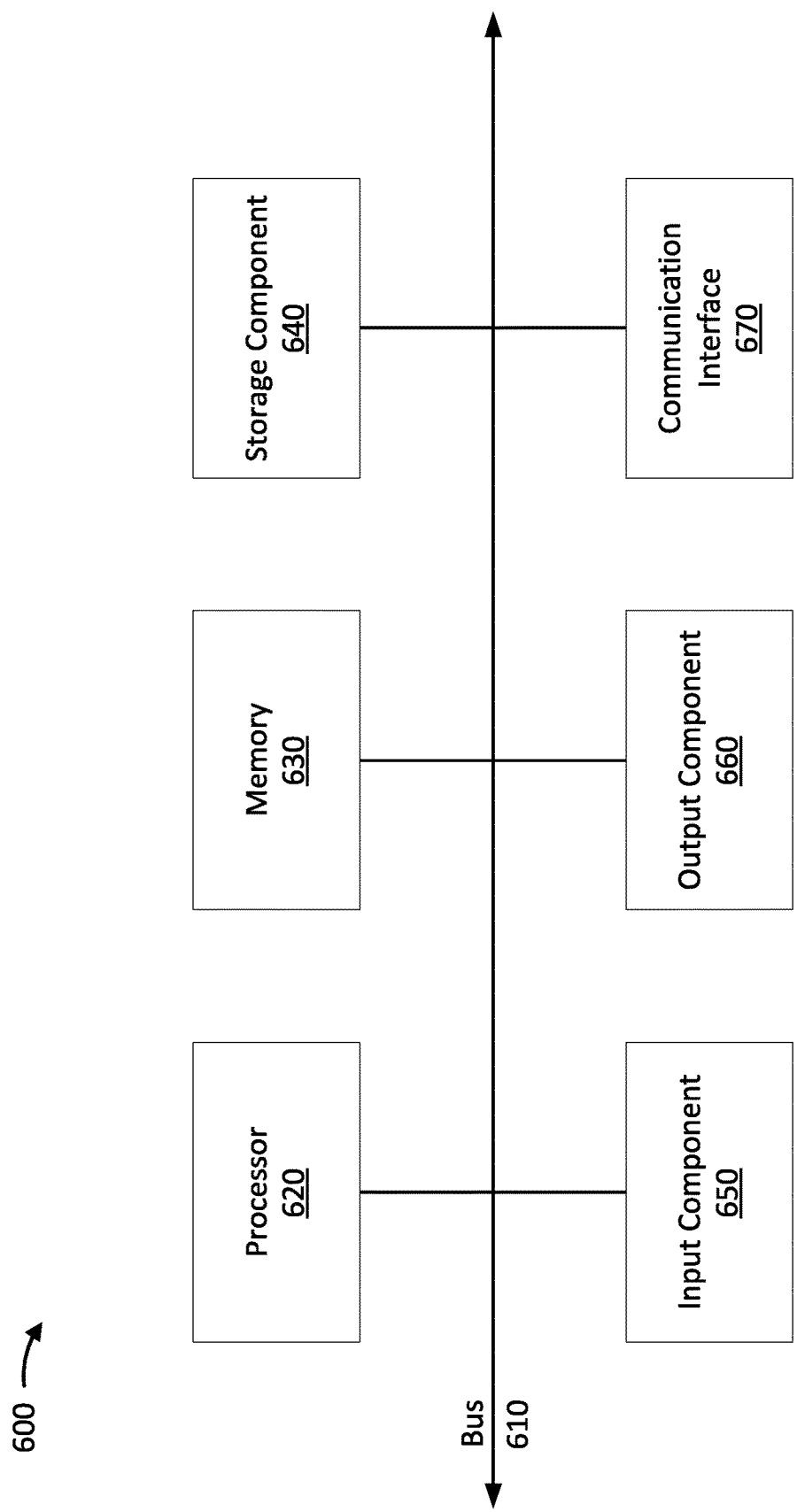

FIG. 6 is an illustration of example devices associated with protecting against network vulnerabilities, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with protecting against network vulnerabilities, according to various aspects of the present disclosure. Example 100 shows an architectural depiction of included components. In some aspects, the components may include one or more user devices 102 capable of communicating with a communication service provider (CSP) control infrastructure 104 over a network 106. In some aspects, the CSP control infrastructure 104 may be owned and operated by a communication service provider and may include a combination of hardware and software components that enable provision of communication services to the one or more user devices 102. In an example, as shown in FIG. 1, the CSP control infrastructure 104 may include a port operation device 108, a processing unit 110, a service database 112, and a plurality of servers including, for example, a web server 114, a secure shell (SSH) server 116, a file transfer protocol (FTP) server 118, and a virtual private network (VPN) VPN server 120. A user device 102 may communicate with the port operation device 108 to obtain communication services such as, for example, web services from the web server 114, secure shell services from the SSH server 116, file transfer services from the FTP server 118, and/or VPN services from the VPN server 120.

The user device 102 may include a communication application 122 (e.g., a pre-authentication application) and/or a processing unit 124 to operate as discussed herein. The communication application 122 may include an application utilized by the user device 102 to interface with the port operation device 108 to communicate information with one or more servers. In an example, the communication application may include third-party applications such as a web browser application, an email application, a social network application, a messaging application, etc. As discussed below in further detail, the port operation device 108 may be configured to control operation modes of ports associated with the plurality of servers. In some aspects, the port operation device 108 may be communicatively coupled with the processing unit 110 and/or the service database 112 to control the operation modes of the ports.

In some aspects, the user device 102 may be a physical computing device capable of hosting the communication application 122 and of connecting to the network 106. The user device 102 may be, for example, a laptop, a mobile phone, a tablet computer, a desktop computer, a smart device, a router, or the like. In some aspects, the user device 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like.

The network 106 may be any digital telecommunication network that permits several nodes to share and access resources. In some aspects, the network 106 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The port operation device 108 may be configured to enable the CSP control infrastructure 104 to provide the communication services to a user device 102. In some aspects, the port operation device 108 may be configured to utilize an associated communication interface to receive, via the network 106, a service request from the user device 102 to establish a connection with a server, from among the plurality of servers. The service request may include an authentication request to authenticate the user device 102 and/or service information indicating a requested communication service. Further, as discussed in further detail with respect to FIG. 2, the port operation device 108 may be communicatively coupled with the processing unit 110 and/or the service database 112 to control an operation mode of a port associated with the server, thereby enabling the user device 102 to obtain the communication services from the server.

The processing unit 110 may be a logical unit including a logical component configured to perform complex operations associated with computing, for example, numerical weights related to various factors associated with providing the communication services. The processing unit 110 may communicate with the port operation device 108 to enable provision of the communication services to the user device 102. The service database 112 may include a memory and/or structured repository of information related to provision of the communication services. In an example, the service database 112 may include authentication information to enable authentication of the user device 102 prior to providing the communication services.

A server from among the plurality of servers 114-120 may include a combination of hardware or software (computer program) for providing services (e.g., functionalities) to other programs or devices (e.g., communication application 122, user device 102, etc.). The server may provide various services including, for example, sharing data or resources among multiple clients, performing computation for a client, communicating data and/or information associated with the other programs or devices, etc. A given server may be configured to serve multiple programs and/or user devices. Multiple servers may provide separate or combined functionalities to serve a given program and/or user device. To provide the services, the server may execute operations on a local device and/or may connect with the remote device for execution of the operations.

One or more components (e.g., port operation device 108, processing unit 110, service database 112, plurality of servers 114-120, communication application 122, processing unit 124) included in the CSP control infrastructure 104 and/or included in the user device 102, as shown in FIG. 1, may further be associated with a controller/processor, a memory, a communication interface, or a combination thereof (e.g., FIG. 6). For instance, the one or more components may include or may be included in a controller/processor, a memory, or a combination thereof. In some aspects, the one or more components may be separate and distinct from each other. Alternatively, in some aspects, the one or more components may be combined with one or more of the other components. In some aspects, the one or more of the components may be local with respect to each other.

Alternatively, in some aspects, the one or more of the components may be located remotely with respect to each other. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A service provider may utilize a CSP control infrastructure to provide communication services to one or more user devices. The CSP control infrastructure may include and/or be associated with a plurality of servers for providing the communication services. To provide the communication services, the plurality of servers may receive service requests from the one or more user devices. In some aspects, the one or more user devices may transmit the service requests to respective ports associated with the plurality of servers.

In an example, a server may be associated with a port configured to receive a service request from a user device. The CSP control infrastructure may determine a mapping between the port and the server such that a service request received at the port is routed to the server. The port may operate in an open mode to receive the service request such that the port is accessible to every user device. In this case, due to the mapping, the service request received at the port may be routed to the server. Based at least in part on receiving the service request, the server may respond with connection information indicating information to be utilized by the user device to communicate with the server. Such connection information may include, for example, identification information associated with the server, version information indicating a version of software and/or an operating system associated with the server, protocol information indicating a communication protocol to be utilized to communicate with the server, etc.

Responding with the connection information in such a way may expose the server to a network vulnerability. In an example, responding with the connection information may expose the server to unauthorized access (e.g., hacking) by a malicious party. In an example, the malicious party may possess exploit software designed to enable the malicious party to gain unauthorized access to the server. In some aspects, the exploit software may have been developed based at least in part on analyzing at least a portion of open-source source code associated with the server, thereby enabling the exploit software to gain the unauthorized access. The malicious party may utilize, for example, a search engine to determine at least part information (information regarding the port) that is associated with the server. Further, the malicious party may utilize the search engine to determine that the information allows unsecured access (e.g., the port is operating in the open mode). The malicious party may utilize the determined information to transmit a service request (e.g., to the port operating in the open mode) such that the service request is routed to the server. Further, the malicious party may receive a response from the server including the connection information. Based at least in part on receiving the connection information, the malicious party may utilize, for example, the identification information, the version information, and/or the protocol information to affect the server with the exploit software, and, thereby, gain unauthorized access to the server.

Because the server may have no prior notice of the possible unauthorized access by the malicious party, the server may be unable to prevent the unauthorized access by the malicious party. Further, based at least in part on gaining the unauthorized access, the malicious party may install malware designed to disrupt operation of the server and/or to damage devices associated with the server. In an example, the malware may embed itself within the operating system of the server and may execute unauthorized transmission of, for example, private information (e.g., client identification information, client location information, bank account information, etc.) stored in a memory associated with the server and/or may execute unauthorized deletion of data stored in the memory. In another example, the malware may cause the operating system to run slower and/or the associated circuitry to emit excessive heat and/or noise, thereby causing damage to devices associated with the server. In such cases, the server may expend various server resources (computational resources, network bandwidth, management resources, processing resources, memory resources, or the like) to mitigate the effects of the unauthorized access.

Various aspects of systems and techniques discussed in the present disclosure enable protecting against network vulnerabilities. In some aspects, a CSP control infrastructure may configure a port operation device to control operation of a port associated with a server, which may be utilized by the CSP control infrastructure to provide communication services to a user device. In an example, the port operation device may be configured to enable the port to operate in a deactivated mode (e.g., close mode) such that a service request received at the port is not routed to the server. In some aspects, the port operation device may enable the port to operate in the deactivated mode based at least in part on temporarily deactivating (e.g., disconnecting) a mapping between the port and the server. In this case, the port operation device may determine whether the received service request is transmitted by an authentic user device authorized to access the server or by a malicious party. In some aspects, the port operation device may make such a determination based at least in part on information received in association with the service request. When the port operation device determines that the received service request is transmitted by the authentic user device, the port operation device may enable the port to operate in an activated mode (e.g., open mode) by activating (e.g., connecting) the mapping between the port and the server. Such activating may enable the received service request to be routed to the server. Alternatively, when the port operation device determines that the received service request is transmitted by an entity other than the authentic user device (e.g., malicious party), the port operation device may discard the received service request while enabling the port to operate in the deactivated mode. As a result, even when the malicious party may possess exploit software designed to enable the malicious party to gain unauthorized access to the server, the port operation device may prevent the malicious party from receiving connection information associated with the server. In this way, the port operation device may prevent a malicious party from utilizing the connection information along with the exploit software to gain unauthorized access to the server. Consequently, the port operation device may prevent private information stored in a memory associated with the server from becoming compromised, the malicious party from disrupting operation of the server, and/or causing damage to devices associated with the server. Further, the port operation device may enable efficient utilization of server resources (computational resources, network bandwidth, management resources, processing resources, memory resources, or the like) for suitable tasks associated with providing the communication services.

In some aspects, an infrastructure device (e.g., port operation device 108, processing unit 110, processor 620, etc.) associated with the CSP control infrastructure may operate a port associated with a server in a deactivated mode; receive a communication from a user device in association with obtaining communication services from the server; pre-authenticate the user device for obtaining the communication services based at least in part on information indicated in the communication; and operate the port associated with the server in an activated mode to enable the user device to establish a connection with the server based at least in part on pre-authenticating the user device.

FIG. 2 is an illustration of an example flow 200 associated with protecting against network vulnerabilities, according to various aspects of the present disclosure. The example flow 200 may include one or more user devices 102 communicating with a port operation device 108 associated with a CSP control infrastructure 104. In some aspects, the one or more user devices 102 and the port operation device 108 may communicate over a network (e.g., network 106). In some aspects, as discussed below in further detail, the one or more user devices 102 may utilize respective pre-authentication applications 122 associated with (e.g., provided by) the CSP control infrastructure 104 to communicate with the port operation device 108. The respective pre-authentication applications 122 may enable authentication of the one or more user devices 102 with the CSP control infrastructure 104 prior to obtaining communication services from one or more servers (e.g., web server 114, SSH server 116, FTP server 118, VPN server 120) associated with the CSP control infrastructure 104.

As shown by reference numeral 210, the CSP control infrastructure 104 may utilize the port operation device 108 to operate a port associated with a server in a deactivated mode. In some aspects, to operate the port in the deactivated mode, the port operation device 108 may deactivate a mapping between the port and the server such that an initial communication (e.g., a pre-authentication request, an authentication request, a service request, etc.) received at the port is not routed to the server. In some aspects, the port operation device 108 may deactivate the mapping between the port and the server temporarily until a user device transmitting the initial communication is pre-authenticated by the port operation device 108.

As shown by reference numeral 220, a user device 102 may utilize a pre-authentication application, associated with the CSP control infrastructure 104, to register an account with the CSP control infrastructure 104. During the registration, the user device 102 may provide registration information such as, for example, identity of an owner of the user device 102, a phone number associated with the user device 102, an email address associated with the user device 102, or the like. Further, during the registration, the CSP control infrastructure 104 and the pre-authentication application may determine unique seed information associated with the registered account. Such seed information may include alphanumeric characters, which may be determined randomly by the pre-authentication application or by the CSP control infrastructure 104. In some aspects, the alphanumeric characters may be determined by the pre-authentication application 122 or by the CSP control infrastructure 104 based at least in part on the registration information provided by the user device 102. The CSP control infrastructure 104 may store a correlation between the unique seed information and the registered account and/or the pre-authentication application 122 installed on the user device 102. In some aspects, the unique seed information may be utilized by the user device 102 or another user device associated with a registered account to obtain the communication services.

As shown by reference numeral 230, the user device 102 may utilize the pre-authentication application 122 to transmit a pre-authentication request to the CSP control infrastructure 104. In some aspects, the pre-authentication request may include a service request for receiving the communication services from the server. In some aspects, the pre-authentication request may include the unique seed information associated with the registered account and/or the pre-authentication application 122 installed on the user device 102. Additionally, the pre-authentication request may include a one-time password in association with the unique seed information. Such one-time password may be valid for a given duration of time, starting from a time associated with communication (e.g., transmission and/or reception) of the pre-authentication request between the user device 102 and the port operation device 108.

As shown by reference numeral 240, the port operation device 108 may pre-authenticate the user device 102 based at least in part on receiving the pre-authentication request. In some aspects, pre-authenticating the user device 102 may include verifying the received seed information. In an example, the port operation device 108 may compare the received seed information with the unique seed information stored in correlation with the registered account and/or the pre-authentication application 122 installed on the user device 102. When a result of the comparison indicates that the received seed information fails to match (e.g., is different from) the unique seed information, the port operation device 108 may determine that the transmitting user device 102 is not an authentic device and is not authorized to receive communication services from the server. In this case, the port operation device 108 may discard the pre-authentication request. Further, the port operation device 108 may continue to operate the port associated with the server in the deactivated mode.

Alternatively, when the result of the comparison indicates that the received seed information matches (e.g., is the same as) the unique seed information, the port operation device 108 may determine that the user device 102 is an authentic device authorized to receive communication services from the server. In this case, the port operation device 108 may determine a current communication parameter (e.g., an internet protocol (IP) address) indicated by the pre-authentication application in the pre-authentication request. In some aspects, the port operation device 108 may determine the current communication parameter based at least in part on analyzing a communication IP packet including the pre-authentication request. In an example, the communication IP packet may include, for example, a header that indicates a current IP address (e.g., communication parameter) utilized by the user device 102 as a source IP address. Further, the port operation device 108 may analyze the one-time password to determine the given duration of time.

Based at least in part on determining that the user device 102 is an authentic device and/or the current communication parameter and/or the given duration of time, as shown by reference numeral 250, the port operation device 108 may pre-authenticate the user device 102 and may transmit a pre-authentication message to the user device 102. The pre-authentication message may indicate that the user device 102 has been pre-authenticated and that the port operation device 108 may operate the port associated with the server in an activated mode. Further, the pre-authentication message may indicate a criterion associated with information to be transmitted by the user device 102 to establish a connection with the server.

Based at least in part on transmitting the pre-authentication message, as shown by reference numeral 260, the port operation device 108 may operate the port associated with the server in the activated mode. In some aspects, the port operation device 108 may operate the port associated with the server in the activated mode by temporarily activating the mapping between the port and the server.

In one example, the port operation device 108 may activate the mapping between the port and the server for the given duration of time. Such activation may be indicated as a criterion in the pre-authentication message. In this case, as shown by reference numeral 270, the user device 102 may utilize the port to establish a connection with the server. For instance, the user device 102 may utilize the pre-authentication application to transmit, prior to an expiration of the given duration of time, an authentication request and/or a service request to establish the connection with the server. The port operation device 108 may determine that the authentication request and/or the service request is received prior to the expiration of the given duration of time. Further, due to the activation of the mapping, the port operation device 108 may route the authentication request and/or the service request to the server and enable the user device 102 to establish a connection with the server. Based at least in part on authentication by the server, the user device 102 may establish the connection with the server and may utilize third-party applications to transmit service requests associated with receiving communication services from the server. The port operation device 108 may route the service requests to the server while the user device 102 is receiving communication services during the established connection with the server.

In another example, the port operation device 108 may activate the mapping between the port and the server in association with the determined communication parameter. Such activation may be indicated as a criterion in the pre-authentication message. In this case, the user device 102 may utilize the pre-authentication application to transmit the authentication request and/or the service request to establish the connection with the server, with the authentication request and/or the service request indicating the communication parameter. For instance, the user device 102 may utilize the pre-authentication application to transmit the authentication request and/or the service request utilizing the same IP address that was used to transmit the pre-authentication request such that the authentication request and/or the service request indicates the same IP address. The port operation device 108 may compare the determined communication parameter with the indicated communication parameter. When a result of the comparison indicates that the determined communication parameter fails to match (e.g., is different from) the indicated communication parameter, the port operation device 108 may determine that the transmitting user device is not an authentic device and is not authorized to receive communication services from the server. In this case, the port operation device 108 may discard the authentication request and/or the service request. Alternatively, when the result of the comparison indicates that the determined communication parameter matches (e.g., is the same as) the indicated communication parameter, the port operation device 108 may determine that the user device 102 is an authentic device authorized to receive communication services from the server. In this case, due to the activation of the mapping, the port operation device 108 may route the authentication request and/or the service request to the server and enable the user device 102 to establish a connection with the server. Based at least in part on authentication by the server, the user device 102 may establish the connection with the server and may utilize third-party applications to transmit service requests associated with receiving communication services from the server. The port operation device 108 may route the service requests to the server while the user device 102 is receiving communication services during the established connection with the server.

In yet another example, the port operation device 108 may activate the mapping between the port and the server for the given duration of time in association with the determined communication parameter. Such activation may be indicated as a criterion in the pre-authentication message. In this case, prior to the expiration of the given duration of time, the user device 102 may utilize the pre-authentication application 122 to transmit an authentication request and/or a service request to establish a connection with the server, the authentication request and/or the service request indicating the communication parameter. In this case, as discussed above, the port operation device 108 may determine whether the authentication request and/or the service request is received prior to the expiration of the given duration of time. Further, as discussed above, the port operation device 108 may determine whether the indicated communication parameter in the authentication request and/or the service request matches the determined communication parameter. When the port operation device 108 determines that the authentication request and/or the service request is received prior to the expiration of the given duration of time and that the indicated communication parameter in the authentication request and/or the service request matches the determined communication parameter, the port operation device 108 may determine that the user device 102 is an authentic device authorized to receive communication services from the server. In this case, due to the activation of the mapping, the port operation device 108 may route the authentication request and/or the service request to the server and enable the user device 102 to establish a connection with the server. Based at least in part on authentication by the server, the user device 102 may establish the connection with the server and may utilize third-party applications to transmit service requests associated with receiving communication services from the server. The port operation device 108 may route the service requests to the server while the user device 102 is receiving communication services during the established connection with the server.

In some aspects, while the user device 102 is receiving communication services during the established connection with the server, the port operation device 108 may be configured to receive, at periodic intervals, the one-time password and/or the unique seed information from the user device 102. Based at least in part on receiving the one-time password and/or the unique seed information during the periodic intervals, the port operation device 108 may continue to route the service requests to the server. Alternatively, when the port operation device 108 fails to receive the one-time password and/or the unique seed information during a given periodic interval, the port operation device 108 may suspend routing of the service requests to the server until the one-time password and/or the unique seed information is received from the pre-authentication application 122 installed on the user device 102.

In some aspects, while the user device 102 is receiving communication services during the established connection with the server, the port operation device 108 may determine, during periodic intervals, whether the indicated communication parameter in the authentication request and/or the service request matches the determined communication parameter. When the port operation device 108 determines, during the periodic intervals, that the indicated communication parameter in the authentication request and/or the service request matches the determined communication parameter, the port operation device 108 may continue to route the service requests to the server. Alternatively, when the port operation device 108 determines that the indicated communication parameter in the authentication request and/or the service request fails to match the determined communication parameter during a given periodic interval, the port operation device 108 may suspend routing of the service requests to the server until the indicated communication parameter in the authentication request and/or the service request matches the determined communication parameter.

In some aspects, while the user device 102 is receiving communication services during the established connection with the server, the pre-authentication application 122 may be configured to determine a change in the communication parameter. When the pre-authentication application determines that the communication parameter has changed, the pre-authentication application may re-transmit a pre-authentication request along with the seed information and/or the one-time password to indicate the new communication parameter. In an example, the user device 102 may utilize a first technology (e.g., Wi-Fi) to access the network 106 (e.g., Internet) while receiving communication services during the established connection. During this time, the user device 102 may change its location. As a result, the user device 102 may start utilizing a different technology (e.g., mobile technology (e.g., LTE, CDMA, GSM, etc.)) to access the network 106. Due to the change in the technology utilized to access the network 106, the IP address may change to a new IP address.

As discussed above with respect to a given port associated with a given server, the port operation device 108 may be configured to control operation of any number of ports associated with any number of servers.

In this way, by controlling operation of ports associated with servers to enable one or more user devices to obtain communication services and/or pre-authenticating the user device, as discussed herein, the port operation device may prevent a malicious party from utilizing the connection information along with the exploit software to gain unauthorized access to the server. As a result, the port operation device may prevent private information stored in a memory associated with the server from becoming compromised, the malicious party from disrupting operation of the server, and/or causing damage to devices associated with the server. Further, the port operation device may enable efficient utilization of server resources (computational resources, network bandwidth, management resources, processing resources, memory resources, or the like) for suitable tasks associated with providing the communication services.

As indicated above, FIG. 2 is provided as an example. Other examples may differ from what is described with regard to FIG. 2.

FIG. 3 is an illustration of an example process 300 associated with protecting against network vulnerabilities, according to various aspects of the present disclosure. In some aspects, the process 300 may be performed by a memory and/or a processor/controller (e.g., processing unit 110, processor 620) associated with an infrastructure device (e.g., port operation device 108) configured by a memory and/or a processor (e.g., processing unit 110, processor 620) associated with a control infrastructure (e.g., CSP control infrastructure 104). As shown by reference numeral 310, process 300 may include operating, by an infrastructure device, a port associated with a server in a deactivated mode. For instance, the infrastructure device may utilize an associated memory and/or processor to operate a port associated with a server in a deactivated mode, as discussed elsewhere herein.

As shown by reference numeral 320, process 300 may include receiving, by the infrastructure device, a communication from a user device in association with obtaining communication services from the server. For instance, the user device may utilize an associated communication interface (e.g., communication interface 670) with the associated memory and/or processor to receive a communication from a user device in association with obtaining communication services from the server, as discussed elsewhere herein.

As shown by reference numeral 330, process 300 may include pre-authenticating, by the infrastructure device, the user device for obtaining the communication services based at least in part on information indicated in the communication. For instance, the user device may utilize the associated memory and/or processor to pre-authenticate the user device for obtaining the communication services based at least in part on information indicated in the communication, as discussed elsewhere herein.

As shown by reference numeral 340, process 300 may include operating, by the infrastructure device, the port associated with the server in an activated mode to enable the user device to establish a connection with the server based at least in part on pre-authenticating the user device. For instance, the user device may utilize the associated memory and/or processor to operate the port associated with the server in an activated mode to enable the user device to establish a connection with the server based at least in part on pre-authenticating the user device, as discussed elsewhere herein.

Process 300 may include additional aspects, such as any single aspect or any combination of aspects described below and/or in connection with one or more other processes described elsewhere herein.

In a first aspect, in process 300, operating the port in the deactivated mode includes disconnecting a mapping between the port and the server.

In a second aspect, alone or in combination with the first aspect, in process 300, pre-authenticating the user device includes comparing received seed information indicated in the communication with stored seed information associated with the user device.

In a third aspect, alone or in combination with the first through second aspects, in process 300, pre-authenticating the user device includes determining a communication parameter associated with the communication based at least in part on determining that received seed information indicated in the communication matches stored seed information associated with the user device.

In a fourth aspect, alone or in combination with the first through third aspects, in process 300, pre-authenticating the user device includes determining a duration of time associated with operating the port in the activated mode based at least in part on determining that received seed information indicated in the communication matches stored seed information associated with the user device.

In a fifth aspect, alone or in combination with the first through fourth aspects, in process 300, operating the port in the activated mode includes connecting a mapping between the port and the server.

In a sixth aspect, alone or in combination with the first through fifth aspects, in process 300, receiving the communication includes receiving the communication at the port.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with protecting against network vulnerabilities, according to various aspects of the present disclosure. In some aspects, the process 400 may be performed by a memory and/or a processor/controller (e.g., processing unit 110, processor 620) associated with an infrastructure device (e.g., port operation device 108) configured by a memory and/or a processor (e.g., processing unit 110, processor 620) associated with a control infrastructure (e.g., CSP control infrastructure 104). As shown by reference numeral 410, process 400 may include pre-authenticating, by an infrastructure device, a user device for obtaining communication services from a server, the pre-authenticating including determining a given duration of time and a communication parameter associated with a pre-authentication request received from the user device. For instance, the infrastructure device may utilize the associated memory and/or processor to pre-authenticate a user device for obtaining communication services from a server, the pre-authenticating including determining a given duration of time and a communication parameter associated with a pre-authentication request received from the user device, as discussed elsewhere herein.

As shown by reference numeral 420, process 400 may include operating, by the infrastructure device, a port associated with the server in an activated mode for the given duration of time to enable the user device to transmit an authentication request indicating the communication parameter prior to an expiration of the given duration of time. For instance, the infrastructure device may utilize the associated memory and/or processor to operate a port associated with the server in an activated mode for the given duration of time to enable the user device to transmit an authentication request indicating the communication parameter prior to an expiration of the given duration of time, as discussed elsewhere herein.

Process 400 may include additional aspects, such as any single aspect or any combination of aspects described below and/or in connection with one or more other processes described elsewhere herein.

In a first aspect, in process 400, operating the port in the activated mode includes connecting a mapping between the port and the server to enable the authentication request to reach the server.

In a second aspect, alone or in combination with the first aspect, in process 400, pre-authenticating the user device includes comparing indicated seed information indicated in the pre-authenticating request with stored seed information associated with the user device.

In a third aspect, alone or in combination with the first through second aspects, process 400 may include transmitting a pre-authentication message to the user device, the pre-authentication message indicating that, to obtain the communication services, the user device is to transmit the authentication request indicating the communication parameter prior to the expiration of the given duration of time.

In a fourth aspect, alone or in combination with the first through third aspects, process 400 may include enabling the authentication request to reach the server based at least in part on determining that the authentication request indicates the communication parameter and is received prior to the expiration of the given duration of time.

In a fifth aspect, alone or in combination with the first through fourth aspects, process 400 may include operating the port in a deactivated mode by disconnecting a mapping between the port and the server to disable the pre-authentication request from reaching the server.

In a sixth aspect, alone or in combination with the first through fifth aspects, process 400 may include discarding the authentication request based at least in part on determining that the authentication request does not indicate the communication parameter or is not received prior to the expiration of the given duration of time.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with protecting against network vulnerabilities, according to various aspects of the present disclosure. In some aspects, the process 500 may be performed by a memory and/or a processor/controller (e.g., processing unit 124, processor 620) associated with a user device/endpoint (e.g., user device 102) executing a pre-authentication application. As shown by reference numeral 510, process 500 may include transmitting, by a user device to an infrastructure device, a first pre-authentication request associated with requesting communication services from a server, the first pre-authentication request indicating a communication parameter associated with the user device. For instance, the user device may utilize an associated communication interface (e.g., communication interface 670) with the associated memory and/or processor to transmit, to an infrastructure device, a first pre-authentication request associated with requesting communication services from a server, the first pre-authentication request indicating a communication parameter associated with the user device, as discussed elsewhere herein.

As shown by reference numeral 520, process 500 may include determining, by the user device while obtaining the communication services from the server, a change in the communication parameter such that the user device is associated with a new communication parameter. For instance, the user device may utilize the associated memory and/or processor to determine, while obtaining the communication services from the server, a change in the communication parameter such that the user device is associated with a new communication parameter, as discussed elsewhere herein.

As shown by reference numeral 530, process 500 may include transmitting, by the user device to the infrastructure device, a second pre-authentication request associated with obtaining the communication services from the server, the second pre-authentication request indicating the new communication parameter. For instance, the user device may utilize the associated communication interface, memory, and/or processor to transmit, to the infrastructure device, a second pre-authentication request associated with obtaining the communication services from the server, the second pre-authentication request indicating the new communication parameter, as discussed elsewhere herein.

Process 500 may include additional aspects, such as any single aspect or any combination of aspects described below and/or in connection with one or more other processes described elsewhere herein.

In a first aspect, in process 500, determining the change in the communication parameter includes determining a change in a technology utilized by the user device to access a network.

In a second aspect, alone or in combination with the first aspect, in process 500, determining the change in the communication parameter includes determining a change in a location associated with the user device.

In a third aspect, alone or in combination with the first through second aspects, in process 500, determining the change in the communication parameter includes comparing the indicated communication parameter in the pre-authentication request with a communication parameter indicated in a service request transmitted while obtaining the communication services from the server.

In a fourth aspect, alone or in combination with the first through third aspects, in process 500, the communication parameter includes an internet protocol (IP) address associated with the user device.

In a fifth aspect, alone or in combination with the first through fourth aspects, in process 500, the pre-authentication request indicates a duration of time for which the infrastructure device is to operate a port associated with the server in an activated mode.

In a sixth aspect, alone or in combination with the first through fifth aspects, in process 500, the first pre-authentication request and the second pre-authentication request include unique seed information associated with the user device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600 associated with protecting against network vulnerabilities, according to various aspects of the present disclosure. In some aspects, the example devices 600 may form part of or implement the systems, servers, environments, infrastructures, components, devices, or the like described elsewhere herein (e.g., CSP control infrastructure, web server, SSH server, FTP server, VPN server, etc.) and may be used to perform example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   pre-authenticating, by an infrastructure device, a user device for obtaining communication services from a server, the pre-authenticating including determining a given duration of time and a communication parameter associated with a pre-authentication request received from the user device; and
   operating, by the infrastructure device, a port associated with the server in an activated mode for the given duration of time to enable the user device to transmit an authentication request indicating the communication parameter prior to an expiration of the given duration of time.

2. The method of claim 1, wherein operating the port in the activated mode includes connecting a mapping between the port and the server to enable the authentication request to reach the server.

3. The method of claim 1, wherein pre-authenticating the user device includes comparing indicated seed information indicated in the pre-authenticating request with stored seed information associated with the user device.

4. The method of claim 1, further comprising:
   transmitting a pre-authentication message to the user device, the pre-authentication message indicating that, to obtain the communication services, the user device is to transmit the authentication request indicating the communication parameter prior to the expiration of the given duration of time.

5. The method of claim 1, further comprising:
   enabling the authentication request to reach the server based at least in part on determining that the authentication request indicates the communication parameter and is received prior to the expiration of the given duration of time.

6. The method of claim 1, further comprising:
   operating the port in a deactivated mode by disconnecting a mapping between the port and the server to disable the pre-authentication request from reaching the server.

7. The method of claim 1, further comprising:
   discarding the authentication request based at least in part on determining that the authentication request does not indicate the communication parameter or is not received prior to the expiration of the given duration of time.

8. An infrastructure device, comprising:

a memory; and a processor communicatively coupled to the memory, the memory and the processor being configured to:

pre-authenticate a user device for obtaining communication services from a server, the pre-authenticating including determining a given duration of time and a communication parameter associated with a pre-authentication request received from the user device; and operate a port associated with the server in an activated mode for the given duration of time to enable the user device to transmit an authentication request indicating the communication parameter prior to an expiration of the given duration of time.

9. The infrastructure device of claim 8, wherein, to operate the port in the activated mode, the memory and the processor are configured to connect a mapping between the port and the server to enable the authentication request to reach the server.

10. The infrastructure device of claim 8, wherein, to pre-authenticate the user device, the memory and the processor are configured to compare indicated seed information indicated in the pre-authenticating request with stored seed information associated with the user device.

11. The infrastructure device of claim 8, wherein the memory and the processor are configured to transmit a pre-authentication message to the user device, the pre-authentication message indicating that, to obtain the communication services, the user device is to transmit the authentication request indicating the communication parameter prior to the expiration of the given duration of time.

12. The infrastructure device of claim 8, wherein the memory and the processor are configured to enable the authentication request to reach the server based at least in part on determining that the authentication request indicates the communication parameter and is received prior to the expiration of the given duration of time.

13. The infrastructure device of claim 8, wherein the memory and the processor are configured to operate the port in a deactivated mode by disconnecting a mapping between the port and the server to disable the pre-authentication request from reaching the server.

14. The infrastructure device of claim 8, wherein the memory and the processor are configured to discard the authentication request based at least in part on determining that the authentication request does not indicate the communication parameter or is not received prior to the expiration of the given duration of time.

15. A non-transitory computer-readable medium configured to store instructions, which when executed by a processor associated with an infrastructure device, cause the processor to:

pre-authenticate a user device for obtaining communication services from a server, the pre-authenticating including determining a given duration of time and a communication parameter associated with a pre-authentication request received from the user device; and operate a port associated with the server in an activated mode for the given duration of time to enable the user device to transmit an authentication request indicating the communication parameter prior to an expiration of the given duration of time.

16. The non-transitory computer-readable medium of claim 15, wherein, to operate the port in the activated mode, the processor is configured to connect a mapping between the port and the server to enable the authentication request to reach the server.

17. The non-transitory computer-readable medium of claim 15, wherein, to pre-authenticate the user device, the processor is configured to compare indicated seed information indicated in the pre-authenticating request with stored seed information associated with the user device.

18. The non-transitory computer-readable medium of claim 15, wherein the processor is configured to transmit a pre-authentication message to the user device, the pre-authentication message indicating that, to obtain the communication services, the user device is to transmit the authentication request indicating the communication parameter prior to the expiration of the given duration of time.

19. The non-transitory computer-readable medium of claim 15, wherein the processor is configured to enable the authentication request to reach the server based at least in part on determining that the authentication request indicates the communication parameter and is received prior to the expiration of the given duration of time.

20. The non-transitory computer-readable medium of claim 15, wherein the processor is configured to operate the port in a deactivated mode by disconnecting a mapping between the port and the server to disable the pre-authentication request from reaching the server.

* * * * *